United States Patent
Schinke et al.

[11] 3,873,209
[45] Mar. 25, 1975

[54] MEASUREMENT OF THIN FILMS BY OPTICAL WAVEGUIDING TECHNIQUE

[75] Inventors: David Paul Schinke, Berkeley Heights; Richard Grant Smith, Basking Ridge, both of N.J.

[73] Assignee: Bell Telephone Laboratories, Inc., Murray Hill, Berkeley Heights, N.J.

[22] Filed: Dec. 10, 1973

[21] Appl. No.: 423,150

[52] U.S. Cl. .......... 356/135, 350/96 WG, 350/96 C
[51] Int. Cl. ..................... G01n 21/46, G02b 5/14
[58] Field of Search .......... 356/135, 136, 107, 108, 356/128; 350/96 WG, 96 C

[56] References Cited
UNITED STATES PATENTS

| | | | |
|---|---|---|---|
| 2,885,923 | 5/1959 | Simmons | 356/136 |
| 3,551,056 | 12/1970 | Fay et al. | 356/108 |
| 3,746,450 | 7/1973 | Smith | 356/135 |

Primary Examiner—Ronald L. Wibert
Assistant Examiner—Conrad Clark
Attorney, Agent, or Firm—D. I. Caplan

[57] ABSTRACT

In order to measure the thickness and refractive index of transparent thin film on a substrate of higher refractive index, such as a film of silicon oxide on a substrate of silicon, an optical wave is coupled into and guided through the film. The guided wave is coupled into the film by means of the phenomenon of the tunneling into the film of an evanescent wave from a beam of light incident on the surface of an adjacent coupling medium at an angle greater than the critical angle for total internal reflection in the medium. The intensity minima of the optical radiation which can be coupled out of the film back into the coupling medium (overall reflection), as a function of angle, yields data from which the desired thickness and refractive index can be determined.

11 Claims, 4 Drawing Figures

PATENTED MAR 25 1975

MEASUREMENT OF THIN FILMS BY OPTICAL WAVEGUIDING TECHNIQUE

FIELD OF THE INVENTION

This invention relates to the field of the measurement of the characteristics of thin films and, more particularly, to the measurement of the thickness and refractive index of a thin film by means of optical radiation techniques.

BACKGROUND OF THE INVENTION

In order to measure the thickness and refractive index of a thin film, various optical interference techniques have been employed in the prior art. Ordinarily, these interference techniques involve a measurement of the transmitted or reflected light from a thin film, both the intensity and the polarization of such light as a function of angles ("ellipsometry"). However, operating with these techniques tends to be somewhat time-consuming. It would therefore be desirable to have a rapid and accurate technique for the measurement of the refractive index and thickness of transparent thin films.

SUMMARY OF THE INVENTION

In order to measure the thickness and refractive index of a transparent thin film on a substrate of higher refractive index than the film, an optical light-guiding technique is employed. According to the technique of this invention, an evanescent optical wave is launched in an air gap contacting the exposed major surface of the transparent thin film. Such an evanescent wave can be launched from an optical prism coupler medium, adjacent the exposed surface of the thin film just across the air gap, in which an optical beam in the prism is incident on its surface contiguous with the air gap at an angle greater than the critical angle for total internal reflection with respect to the air gap. As known in the art, an evanescent wave is charaterized by an exponentially decreasing value of intensity in the air gap as a function of distance from the surface of the medium. Thereby, various modes of the thin film waveguide type can be supported by the thin film, propagating in an average direction parallel to the surface of the film. These modes are excited respectively in response to optical beams having certain angles of incidence greater than the critical angle in the aforementioned optical prism. These modes are also characterized by the phenomenon that the optical radiation in them will undergo a relatively large amount of absorption by the substrate (of higher refractive index than the film), a "resonance" type effect. Moreover, the corresponding angles of incidence (resonance angles) in the optical coupler at which these modes will be excited in the film (and thus absorption will take place by the substrate) depend upon the thickness of the thin film and the refractive index of the film at the wavelength of the optical radiation being employed. When the angles of incidence are removed from these resonance angles, relatively small amounts of optical radiation are absorbed by the substrate, the radiation being almost totally overall reflected by the thin film-substrate structure in such cases. Moreover, the angles of incidence, at which maximum absorption (minimum overall reflection) takes place, are rather well-defined angles. These angles can be measured by a photodetector of the optical radiation which is coupled back to the coupler medium (overall reflected) by the film-substrate structure. Since there are two quantities desired to be measured, namely, the refractive index and the thickness of the thin film, measurement of two different angles of maximum absorption can yield both the desired refractive index and the thickness of the thin film, either by using the mathematical relations underlying the propagation of optical radiation in the various modes of a thin film or by comparison with calibration curves of known film-substrate samples.

In the specific embodiment of this invention, apparatus for measuring a thin film includes an optical prism, of gadolinium garnet for example, serving as an optical coupler. The prism is placed firmly against the thin film on a substrate of higher refractive index, for example a thin silicon oxide type of layer, typically silicon dioxide, on a substrate of silicon. An externally applied compression force presses the optically flat surface of the prism against the exposed surface of the silicon oxide film, thereby defining a very thin "parallel plate" type of air gap between the prism and the film. An optical laser beam in the visible portion of the spectrum is incident on the prism such that the angle of incidence at the prism surface contiguous with the air gap is greater than the critical angle in the prism. Thereby, an evanescent wave is produced in the air gap and is coupled into the thin film. An optical detector measures the overall reflected radiation from the thin film as a function of different angles of incidence of the laser beam in the prism. Advantageously, at least two minima in the optical intensity of the reflected radiation as a function of angle are measured. From these two angles, the refractive index as well as thickness of the thin film can be calculated either from electromagnetic theory or by calibrating the apparatus using thin films of known refractive index and thickness.

BRIEF DESCRIPTION OF THE DRAWING

This invention, together with its features, advantages and objects, may be better understood from a reading of the detailed description in conjunction with the drawing in which.

Only for the sake of clarity, none of the drawings is to scale.

DETAILED DESCRIPTION

Figure 1:
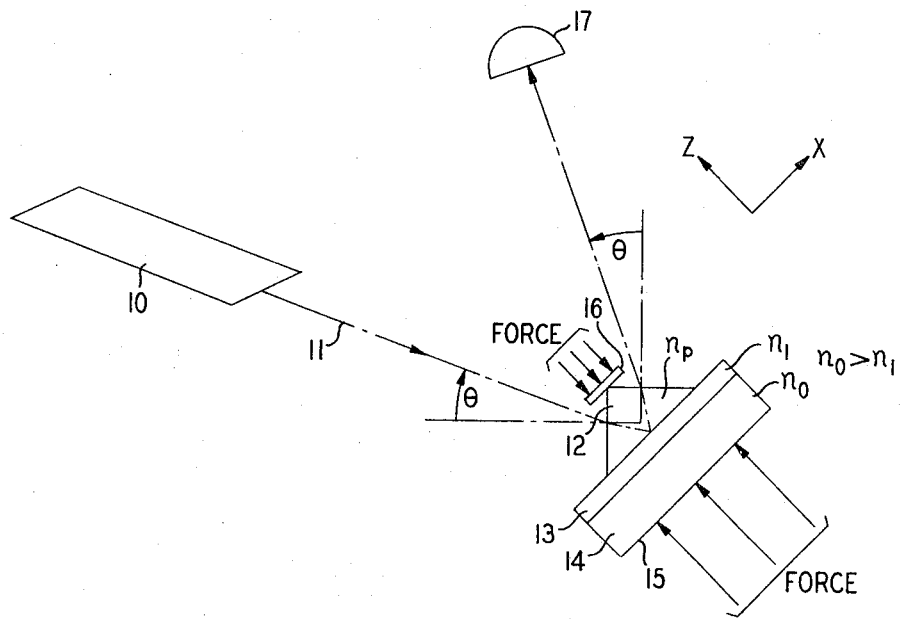
FIG. 1 shows apparatus for measuring the thickness and refractive index of a transparent thin film by optical waveguiding techniques in accordance with a specific embodiment of the invention.

As shown in FIG. 1, a laser 10 supplies a beam of optical radiation 11 incident at an angle of incidence $\theta$ with respect to normal of an optical prism 12, typically a right-angle isosceles prism. For example, the prism 12 is made of gadolinium gallium garnet; and the laser 10 is a helium-neon laser (wavelength of 6,328 angstroms). The prism 12 is held firmly by a compressive force pair, labeled FORCE (and hereinafter abbriviated F), against the exposed major surface of the thin film 13. A rigid plate 16 at the apex of the prism 12 conveniently facilitates the application of the force F to the prism. The thin film 13 to be measured, typically a silicon oxide type layer, such as silicon dioxide, approximately 5,000 to 11,000 angstroms thick, is located on a substrate 14, typically of silicon of the order of 1 millimeter thick. The oxide film 13 is typically formed by thermal oxidation of the silicon substrate 14, or by chemical vapor deposition on the silicon substrate.

The refractive index of the silicon substrate 14 is denoted in the FIG. 1 by $n_o$, that of the thin film silicon oxide layer 13 by $n_1$, and that of the prism 12 by $n_p$ (relative to the refractive index of the air gap). It is important in the practice if this invention that $n_o$ be greater than $n_1$, so that substantial absorption by the substrate can occur when the resonance modes are launched in the thin film. An optional absorptive layer 15 can be located on the bottom surface of the substrate 14 in case that the bulk substrate 14 is not sufficiently absorptive itself.

Advantageously, the beam 11 is incident upon the prism 12 such that when the beam strikes the hypotenuse of the prism at the air gap adjacent the thin film 13, the beam is directed at an angle of incidence greater than the critical angle in the prism. Thereby, "total internal reflection" takes place and an evanescent wave is launched in the air gap. At certain angles of incidence $\theta$ of the laser beam, modes of optical radiation will be supported in the thin film propagating in the X direction, which are associated with absorption by the substrate. An optical detector 17 measures the intensity of the reflected beam of optical radiation emanating by overall reflection from the film 13. This reflected beam will be propagating in a direction at an angle also equal to $\theta$ with respect to the normal to the face of the isosceles right-angle prism through which the reflected beam emanates.

For convenience, in order to vary the angle of incidence $\theta$, the assembly of prism, substrate with this film, and a mechanism (not shown for clarity) for supplying the compressive forces F, are all mounted on the rotatable platform of a spectrometer.

Figure 2:
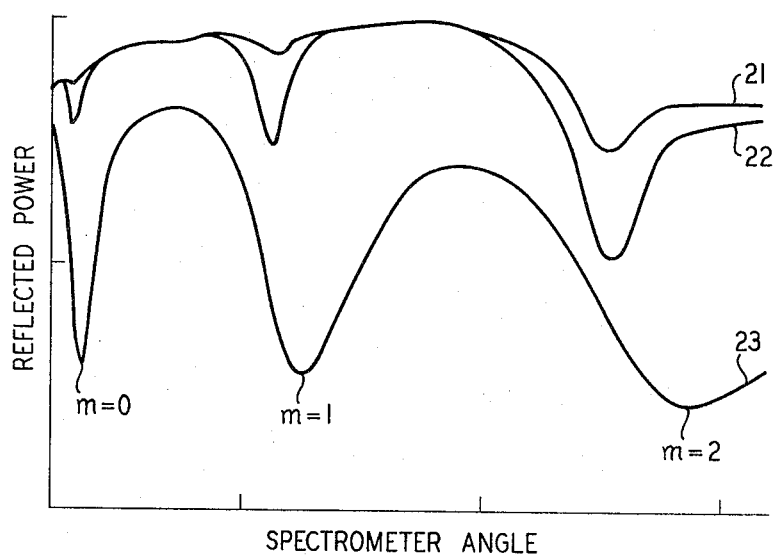
FIG. 2 is a plot of reflected optical intensity versus angle of incidence, which is useful in describing the results obtained with the apparatus shown in FIG. 1.

Using optical radiation advantageously polarized such that the electric vector of the beam 11 is in the Y direction (perpendicular to the plane of the drawing), corresponding to TE modes in the film 13, it is found that as indicated in FIG. 2 at certain angles of incidence $\theta$ the intensity of the reflected radiation undergoes a relative minimum of intensity.

FIG. 2 shows a graph of reflected intensity versus angle of incidence $\theta$, for a specific sample of an approximately 0.9 micron-thick silicon oxide film 13 on a silicon substrate 14, using a wavelength of 6,328 angstroms supplied by a helium-neon type laser source 10. The three curves 21, 22 and 23, respectively, are for increasing values of the force pair F compressing the optical prism coupler 20 against the thin film 13. Each of these curves exhibits three relative minima, $m=0$, $m=1$ and $m=2$, corresponding to these different modes excited in the thin film at the respective angles of incidence. Just two of these angles at which minima occur are sufficient for determining the refractive index and thickness of the thin film, the third angle serving as a check on these results. Curve 21 corresponds to an air gap width of about 0.15 micron; curve 22 to a gap of about 0.10 micron; and curve 23 to a gap of about 0.05 micron. In all events, the air gap should be less than one-half the wavelength of the beam 11.

While the minima of $\theta$ for the case of weak coupling (relatively large air gap), indicated by curve 21, are not as pronounced as those associated with the more closely coupled cases, depicted by curves 22 and 23, nevertheless, the weak coupling minima furnish useful data. Also, it has been found that there is a slight though measurable pulling towards smaller angle of the modes with increasing compressive force. It is believed that this slight pulling is due to a change of propagation constant in the thin film caused by the close proximity of the coupling medium of refractive index $n_p$ which is greater than $n_1$. Therefore, and as an empirically established rule, accuracy of measurement is obtained when the depth of the minima corresponds to the absorption of less than about one-half of the incident optical radiation. In any event, the values of $\theta_0$, $\theta_1$ and $\theta_2$ corresponding to the modes $m=0$, $m=1$ and $m=2$ provide three values for the determination of only two quantities, the refractive index and the thickness of the thin film, so that one of these values can serve as a check upon the results.

Figure 3:
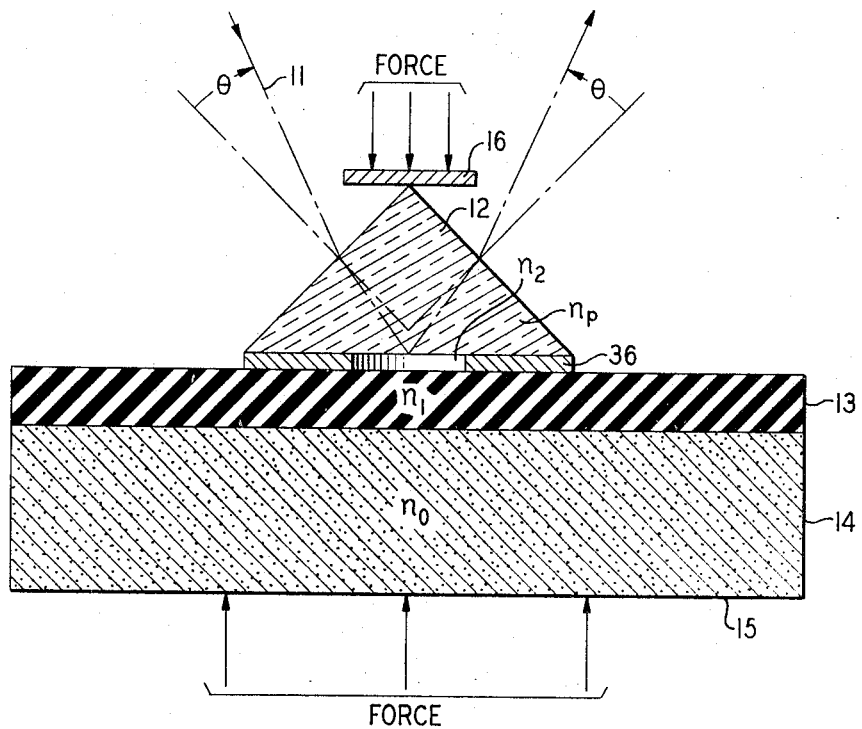
FIG. 3 shows an arrangement for coupling an optical prism with a thin film, which is useful in the practice of this invention.

In order to have a standardizable compressive force F resulting in an air gap which is independent substantially of variations in F itself, the arrangement depicted in FIG. 3 may be utilized. As shown in this Figure, the prism 12 is separated from the film 13 by an annular opaque metal ring 36, typically of tungsten, of the order of 1,000 angstroms thick. Thereby, so long as the forces F exceed a threshold value, the distance between the hypotenuse of the prism 12 and the exposed surface of the thin film is substantially independent of these forces. In this way, the thickness of the air gap between the prism 12 and the thin film 13 is likewise independent of compressive force F. Thus, the metal ring 36 serves to standardize the air gap width, independent of the compressive forces F (above threshold).

Theory

The incident beam 11 strikes the hypotenuse of the prism at a "coupling" angle $\theta_c$ in the prism with respect to the normal to this hypotenuse, where $\theta_c$ satisfies Snell's law.

$$n_p \sin(45° - \theta_c) = \sin \theta \quad (1)$$

For angles $\theta_c$ greater than the critical angle, an evanescent wave is set up in the air gap. Some of the evanescent optical radiation in the air gap enters the thin film 13. In accordance with known principles, the radiation in the thin film 13 undergoes multiple successive internal reflections at the film-gap interface and at the film-substrate interface. Under the condition of resonance, after propagation with two reflections (one each at the respective interfaces) the multiply internally reflected wave should be in phase (constructive interference) with the initial evanescent wave (of vacuum wavelength $\lambda$); that is:

$$2bW - 2\phi_0 - 2\phi_2 = 2m\pi \quad (2)$$

where $W$ is the thickness of the film, $m$ is an integer, and $b$, $\phi_0$ and $\phi_2$ satisfy:

$$b^2 = (kn_1)^2 - \beta_m^2 \tag{3}$$

$$\tan \phi_0 = \left| \beta_m^2 - (kn_0)^2 \right|^{1/2}/b \tag{4}$$

$$\tan \phi_2 = \left| \beta_m^2 - (kn_2)^2 \right|^{1/2}/b \tag{5}$$

wherein:

$$k = 2\pi/\lambda \tag{6}$$

$$\beta_m = n_p \sin \theta_c \tag{7}$$

It should be recognized that these equations are valid only for the transverse electric (TE) mode, i.e., in which the optical polarization corresponds to the electric vector being perpendicular to the plane of the drawing in FIGS. 1 and 3. This result is similar to that of P. K. Tien in *Applied Optics*, 10, 2395 (1971), but it does not consider the case where $n_0$ is greater than $n_1$. The angles $\phi_0$ and $\phi_2$ in equations (4) and (5) are recognizable as the phase shifts undergone on reflections at the film-air and film-substrate interfaces, respectively. There may also be transverse magnetic (TM) modes, corresponding to the polarization of the electric vector in the incident beam 11 being in the plane of FIGS. 1 and 3, but the multiple reflections of these modes are typically so weak in intensity that very little (if any) resonance absorption effect by the substrate is observable. For the TE modes, however, there are usually sufficient multiple reflections to observe a rather sharp decrease in overall reflected light at the resonance angles of incidence, $\theta$, i.e., where the corresponding coupling angle $\theta_c$ is such that equations (2) through (5) are satisfied.

It should be noted that for a silicon substrate, which behaves primarily as a dielectric with (high) index $n_0$ equal to about 3.5, the phase shift $\phi_0$ is equal to $\pi/2$ radians for all practical purposes, so that the resonance condition equation (2) then simplifies to $$2bW - 2\phi_2 = (2m + 1)\pi \tag{2.1}$$

In any event, for the TE polarization, the measured values of $\theta_c$ for two resonances (i.e., two values of the integer $m$ in equation (2) or (2.1)) can be used to calculate both the thickness W and the refractive index $n_1$ of the thin film, assuming the refractive indices $n_p$ and $n_2$ for the prism and air gap respectively are known, for a given (known) wavelength $\lambda$. Ordinarily, the thickness to be measured by this invention should be greater than $\lambda/n_1$. However, if the refractive index (or the thickness of the film) is known by some other method, then only a single angle $\theta_c$ for a single resonance need be measured and somewhat thinner films can then be measured as low as $\lambda/2n_1$ in thickness.

Figure 4:
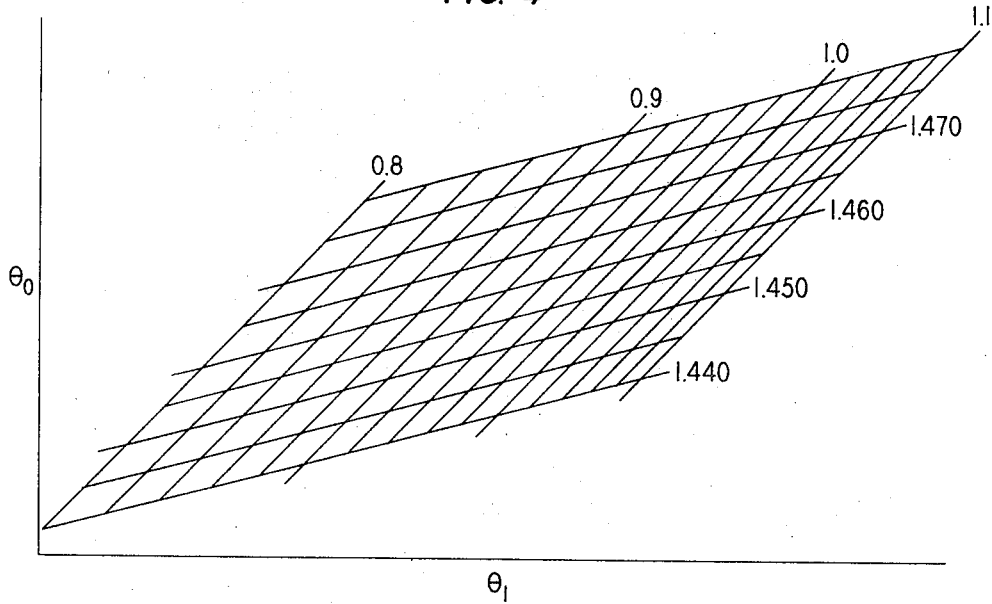
FIG. 4 is a cross-plot from which refractive index and thickness of a thin film can be determined in a specific embodiment of the invention.

FIG. 4 is a graph of the results obtained in the practice of this invention with monochromatic radiation of wavelength $\lambda = 0.6328$ micron (He-Ne laser). The ordinate of this graph is $\theta_0$, the angle $\theta$ at which the minimum of overall reflected intensity occurs corresponding to that particular TE mode for which $m=0$; whereas the abscissa is $\theta_1$, the angle of minumum reflected intensity corresponding to that TE mode for which $m=1$. This graph has been obtained by computer calculation using equations 2.1, 3-7 above, for the case where $n_2 = 1.0012$ (air gap), $n_p = 1.9650$ (prism made of gadolinium gallium garnet), and $n_0 = 3.5$ (silicon substrate). Lines of constant refractive index, running nearly horizontally, are shown in increments of 0.005; and lines of constant film thickness, running diagonally upwards, are shown in increments of 200 angstroms. Thus, the measurements of $\theta_0$ and $\theta_1$ can be used to determine from FIG. 4 the refractive index and thickness of a thin film using a gadolinium gallium garnet prism with a He-Ne laser. In this way, the thickness and refractive index of, for example, a film of silicon dioxide on a silicon substrate can be determined in as little time as one minute.

While this invention has been described in terms of specific embodiments, various modifications can be made without departing from the scope of the invention. For example, thin films of silicon oxide on other substrates such as gallium phosphide, gallium arsenide, or gallium aluminum arsenide can be measured according to the teachings of this invention; and other thin films such as aluminum oxide and silicon nitride on silicon or other substrates can likewise be measured. In case the substrate (and film) is not optically isotropic, that is, birefringent, then both of its refractive indices should be greater than that (those) of the (birefringent) thin film. Finally, other coupler prisms than gadolinium gallium garnet can be used in this invention, such as titanium dioxide (rutile); and other lasers than He-Ne, such as a $CO_2$ laser, can be used.

What is claimed is:

1. The method of testing a thin film on a substrate of higher refractive index than the film at a given wavelength of optical radiation which comprises the steps of
   a. launching an evanescent wave of the optical radiation containing said wavelength in an air gap between a portion of an exposed major surface of the thin film and a first medium, said evanescent wave being produced in the air gap by means of a beam of optical radiation at said wavelength propagating at an angle greater than the critical angle in the first medium, whereby the optical wave in the first medium is coupled into the thin film; and
   b. determining the angle of incidence at which the intensity of the optical wave beam reflected from the thin film on the substrate undergoes a relative minimum of intensity, said beam being reflected from the film as radiation coupled out of the film arising from the evanescent wave's having been coupled into the film.

2. The method recited in claim 1 which further comprises the step of applying a compressive force between the first medium and the thin film while said measurements are being made in step (b).

3. Apparatus for testing a thin film on a substrate of higher refractive index at a given wavelength, which comprises:
   a. a source of essentially monochromatic beam of optical radiation of said wavelength;

b. an optical coupler medium having a major surface defining an air gap with respect to a portion of an exposed major surface of the film, such that the beam is incident in the coupler medium at said surface thereof at an angle greater than the critical angle, such that an evanescent optical radiation wave is generated in the air gap, at least some of the radiation in the evanescent wave entering the thin film and thence being coupled out of the film whereby at least some of the radiation in the film is absorbed in the substrate when the beam is directed at certain angles of incidence in the medium.

4. Apparatus according to claim 3 which further includes means for varying the angle of incidence in the medium whereby the overall reflected radiation from the film goes through a relative minumum in response to varying said angle.

5. Apparatus according to claim 4 which further includes means for applying a force to compress the coupling medium against the exposed surface of the film.

6. Apparatus according to claim 5 in which the coupler is an optical prism.

7. Apparatus according to claim 3 in which the coupler is an optical prism.

8. Apparatus according to claim 3 which further includes means for applying a force to compress the coupling medium against the exposed surface of the film, thereby to limit the width of the air gap to less than one-half said wavelength.

9. Apparatus according to claim 3 in which the thin film is silicon dioxide and the substrate is silicon.

10. Apparatus according to claim 9 in which the coupler medium is gadolinium gallium garnet and the beam of optical radiation is supplied by a helium-neon laser.

11. Apparatus for measuring a thin film on a substrate of higher refractive index at a given optical wavelength which comprises:
 a. an optical prism;
 b. means for compressing a face of the prism against the exposed surface of the film, to define an air gap therebetween of width less than one-half the optical wavelength; and
 c. means for detecting optical radiation at said wavelength which is overall reflected as a reflected output beam by the thin film by virtue of optical input radiation's being incident thereon from the prism at an angle in said prism which is greater than the critical angle for total internal reflection, whereby the input radiation is coupled into the thin film from an evanescent wave produced in the air gap and consequently optical radiation is coupled out of the film as the reflected output beam.

* * * * *

UNITED STATES PATENT OFFICE
CERTIFICATE OF CORRECTION

PATENT NO. : 3,873,209
DATED : March 25, 1975
INVENTOR(S) : David P. Schinke and Richard G. Smith It is certified that error appears in the above-identified patent and that said Letters Patent are hereby corrected as shown below:

Column 2, line 13, before "garnet" insert --gallium--;
          line 62, before "normal" insert --the--.
Column 3, line 52, after "reflected" insert --optical--.

Signed and Sealed this twenty-ninth Day of July 1975

[SEAL]

Attest:

RUTH C. MASON
Attesting Officer

C. MARSHALL DANN
Commissioner of Patents and Trademarks